United States Patent [19]

Barb

[11] Patent Number: 4,700,746

[45] Date of Patent: Oct. 20, 1987

[54] CONTROL VALVE FOR HIGH PRESSURE FLUIDS

[75] Inventor: Gayle E. Barb, Houston, Tex.

[73] Assignee: Anchor/Darling Valve Company, Williamsport, Pa.

[21] Appl. No.: 711,585

[22] Filed: Mar. 13, 1985

[51] Int. Cl.[4] .......................... F16K 1/36; F16K 47/02
[52] U.S. Cl. ............................. 137/625.28; 251/205; 251/902
[58] Field of Search ............................ 251/902, 205; 137/625.28, 625.3

[56] References Cited

U.S. PATENT DOCUMENTS

| | | | |
|---|---|---|---|
| 1,395,932 | 11/1921 | Staude | 251/902 X |
| 2,363,279 | 11/1944 | Anschicks | 251/902 X |
| 2,965,129 | 12/1960 | Faust | 251/902 X |

FOREIGN PATENT DOCUMENTS

| | | | |
|---|---|---|---|
| 1116952 | 11/1961 | Fed. Rep. of Germany | 137/625.28 |
| 1195460 | 5/1959 | France | 251/902 |
| 138532 | 12/1952 | Sweden | 251/902 |

Primary Examiner—Arnold Rosenthal
Attorney, Agent, or Firm—Browning, Bushman, Zamecki & Anderson

[57] ABSTRACT

A control valve for dissipating the energy of a high pressure flowing media, the apparatus comprising a valve body having an internal cavity, an inlet and at least one outlet, the inlet, outlet and cavity being in communication to form a flow path through the body of the valve, a plurality of helical springs being arranged one within the other and disposed in the cavity with the convolutions of the innermost of the springs defining an axial fluid media pathway in open communication with the inlet, there being an actuator operable externally of the body for selectively effecting axial, reciprocal movement of the convolutions of the springs whereby the axial spacing between the convolutions of the springs is altered to control the fluid media flow from the pathway through the spaces between the convolutions to the outlet.

8 Claims, 1 Drawing Figure

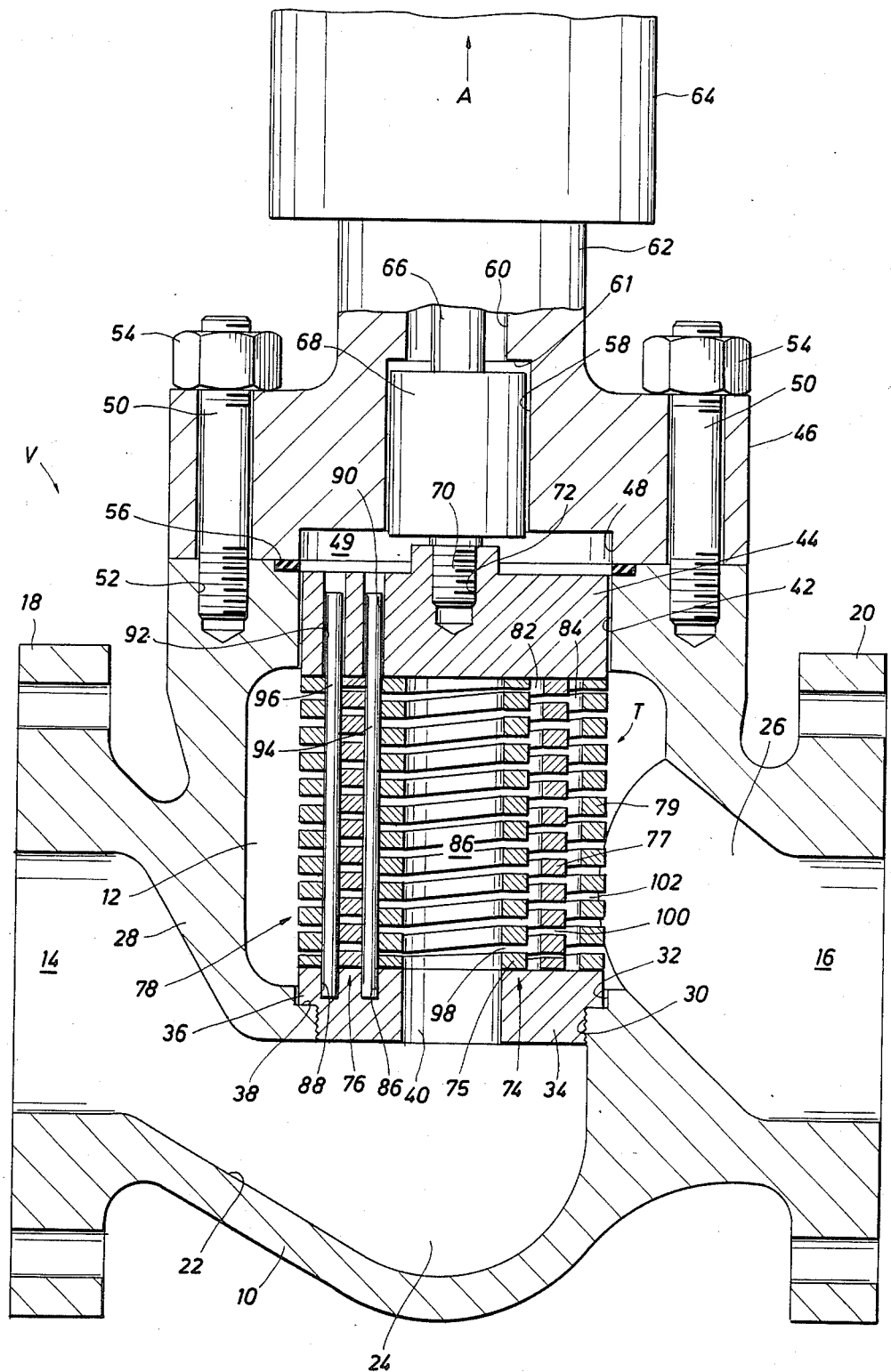

CONTROL VALVE FOR HIGH PRESSURE FLUIDS

BACKGROUND OF THE INVENTION

1. Field of the Invention

The present invention relates generally to control valves for controlling flowing fluids and more particularly to control valves for dissipating the energy of high pressure drop flowing fluids.

2. Description of the Background

The high velocity attained by the flowing fluid as it passes through the valve affects the life and application of the control valve. It is known that the damaging effects resulting from the velocity may be reduced by effecting an energy change or conversion of energy in a control valve. Velocity control reduces the erosion of the valve elements by direct impingement of liquid, droplets or foreign matter suspended in the fluid stream. Additional erosion results from cavitation damage which can be reduced by lowered velocity in the valve. Noise generation is a function of velocity raised approximately to the eighth power. Significant noise reduction with little velocity reduction can thus meet any government and industry standards of radiated noise. The problem of quiet operation is of importance in connection with submarines, hospitals or other installations where minimum radiated noise under operating conditions is essential.

The above problems have been widely recognized throughout the valve industry for many years. Attempted solutions have included the conversion of energy of a flowing high pressure drop fluid by subdividing it into a plurality of passageways. Multiple changes in direction provide a tortuous path for the fluid. The result is a pressure drop and velocity control as a function of changes in direction. See, for example, U.S. Pat. No. 3,154,074.

U.S. Pat. No. 3,821,968 discloses a control valve employing cylindrical valve elements. The valve elements are perforated to provide a restriction to fluid flow via a high wetted area to flow area. Resulting flow and fluid friction converts some of the flow energy into heat.

U.S. Pat. No. 3,896,834 discloses a valve for reducing noise resulting from the fluid flow in which the flow controlling valve element is formed as a single helical wound spring, either of the compression or tension type. When the helices are in mutual contact, fluid flow is prevented wherein when the helices are separated in an axial direction, fluid flows through the spaces therebetween.

German Pat. No. 2,316,453 discloses a valve structure having a single conical spring disposed in the flow path between its inlet and outlet. The spring is attached to a valve plug and the reciprocal motion of the plug causes the spring to expand, whereby the space between the convolutions of the spring can be expanded or contracted. When the convolutions of the spring are separated in an axial direction, fluid flow is permitted therethrough.

SUMMARY OF THE INVENTION

It is therefore an object of the present invention to provide an improved control valve of the type in which the energy, velocity and pressure of the fluid medium flowing therethrough are lowered, resulting in reduced noise and cavitation.

Another object of the present invention is to provide a control valve which incrementally dissipates the energy of a high pressure fluid flowing therethrough to reduce noise and cavitation of the flowing medium.

Another feature of the present invention is to provide a control valve which has a lengthened flowpath to reduce noise and cavitation.

The above and other features of the present invention will become apparent from the drawings, the description given herein, and appended claims.

In accordance with the above objects, the present invention provides a control valve for dissipating the energy of a high pressure flowing fluid, the valve comprising a valve body having an internal cavity, an inlet, and at least one outlet. The inlet and the outlet extend from the outside of the body and are in communication with the cavity to form a flow passage through the body of the valve. A plurality, e.g. two or more, of helical springs are arranged one within the other and are disposed within the cavity with the convolutions of the innermost of the springs defining an axial fluid media pathway which is in open communication with the inlet. The valve also includes a means operable from without the body for selectively effecting axial, reciprocal motion of the convolution of the springs which varies the axial spacing between the convolutions of the springs to thereby control the fluid media flow from the pathway through the spaces between the convolutions of the springs to the outlet.

BRIEF DESCRIPTION OF THE DRAWING

The invention may be more fully understood by reference to the following description in conjunction with the single FIGURE which is an elevational view, partly in section, of a typical embodiment of the valve of the present invention. It should be clear to those familiar with the state of the art that the invention can be placed in an angle globe type body, that is, the valve inlet and outlet may be normal to each other.

DETAILED DESCRIPTION OF THE TYPICAL EMBODIMENT

Referring to the drawing, the control valve, shown generally as V, comprises a valve body 10 having an internal cavity 12, an inlet passage 14 and at least one outlet passage 16. The inlet passage 14 and the outlet passage 16 are shown in line axial alignment but may be normal to each other as per an angle globe type body. Said passageways communicate with cavity 12, forming a flow pathway through the body 10 of the valve V. Body 10 is shown with annular flanges 18 and 20 suitable for connecting with the mating flanges of a pipe or like (not shown) in the well known manner. Those familiar with the state of the art recognize that other industry accepted end connections may be used, that is, threaded, socket weld, butt weld, groove type, etc.

Body 10 includes an internal web or bridge 28 which generally separates the inlet and outlet flow passageway and is provided with a threaded bore 30. Received into threaded bore 30 is a complementary threaded seat or support member 34 having an annularly extending ring 36 which fits into the counterbore 32 formed in web 28. Those familiar with the state of the art will recognize that the seat may be affixed to the web in many different manners, that is, bolted, swagged, etc. Support member 34 is formed with a generally centrally located opening 40 which is in open communication with portion 24 of the inlet passage 14.

Body 10 further includes a generally cylindrical opening 42 which is also in open communication with cavity 12. Received in cylindrical opening 42 is a plunger member 44 which is generally cylindrical in configuration and is sized so as to be slidably, axially movable in cylindrical opening 42. A bonnet 46 is shown to be secured to body 10 by means of threaded studs 50 and nuts 54. An annular gasket 56 provides fluid tight sealing between bonnet 46 and body 10. Those familiar with the state of the art realize that many other industry accepted designs may be readily used to effect a body bonnet pressure tight seal. A flange 64 integrally formed with bonnet 46 neck 62 provides a means of securing an actuator (not shown) in the well known fashion for a purpose to be described later. Extending through counterbores 48, 58 and 60 is a shaft or stem 66 which is axially slidable in a suitably sized guide 68 secured in counterbore 58. Guide 68 may be press fit or threaded into counterbore 58. Stem 66 packing or seal (not shown) is of industry accepted design and is located in the neck 62 portion of bonnet 46. Stem 66 also includes a threaded end 70 which is received in a threaded bore in plunger 44.

Received in cavity 12 and disposed between support member 34 and plunger 44 is the valve trim, shown generally as T. The valve trim T may be considered to be comprised of helically coiled springs and rods. Helically coiled springs 74, 76 and 78 are shown with rods 94 and 96. Springs are concentrically located with respect to each other and separated radially by the rods. Spring 74, being of the smallest diameter, defines a generally cylindrical pathway 80 which is generally concentric with respect to opening 40 in support member 34. Springs 74 and 76 define a first annulus 82 therebetween while springs 76 and 78 define a second annulus therebetween. Support member 34 and plunger member 44 include a first set of circumferentially spaced holes 86 which are generally in register with first annulus 82 and a second set of like holes 88 which are generally in register with the second annulus 84. While holes 86 and 88 do not extend entirely through support member 34, registering holes 90 and 92, respectively, extend through plunger member 44. It can thus be seen that plunger 44 can move along rods 94 and 96, i.e. it can move in a reciprocating motion in the chamber 49. Rods 94 and 96 serve to maintain spacing between springs and are secured into support member 34 by suitable press fit, threading, welding, etc.

In the embodiment shown, springs 74, 76 and 78 are of the compression type and in their free length normally have a spacing between the convolutions. Thus, spring 74 is provided with spacings 98 between convolutions. In a like manner, springs 76 and 78, respectively, have spacings 100 and 102. It will be appreciated that since, in the embodiment shown the springs are of the compression type, they need not be secured to support member 34 and/or plunger 44. It is also obvious to those familiar with the state of the art that the shown embodiment of three springs can be expanded to multiple concentrically oriented springs and rods as befits the process operating conditions. Further, the embodiment is not to be construed as to concentrically orientated springs only. An annulus shape approaching a crescent may be an advantage in some process flow control applications.

In operation, the valve operates as follows: the fluid media enters the valve V via inlet passage 14 and passes into pathway 80 via opening 40 in support member 34. The fluid then passes radially out of pathway 80 through spacings 98 in spring 74 into annulus 82, through spacings 100 in spring 76 into annulus 84, and finally through spacings 102 in spring 78 into cavity 12. From cavity 12, the fluid exits valve V through outlet 16. In order to throttle the flow of the high pressure fluid through the valve V, it is only necessary to reduce the spacings between the convolutions of the springs. To effect this, the plunger 44 is caused to move toward the support member 34. The motion is caused by the actuator (not shown).

By selectively biasing the plunger 44 such that a preferable width of spacing between the spring convolutions is achieved, the energy of the flowing fluid is incrementally lowered by several known mechanics of fluid flow. A high wetted area to flow area, approaching theoretical infinity, is achieved. Such an action forces the fluid to shear upon itself thus converting some of the flow energy into heat. Multiple stage pressure drop makes for multiple applications of the coefficient of contraction and coefficient of expansion. Such coefficients are less than one (100 percent) thus additional energy conversion is achieved. The flow path through the springs and annuli is not a straight line, thus a tortuous path is created with multiple changes of direction of fluid flow which further enhances the conversion and dissipation of flowing fluid energy. Reduced possibility of cavitation and noise generation are the results obtained from the application of this embodiment to a process application.

The embodiment shown and described above considers the spring to be of the compression type and therefore need not be attached at their opposite ends to the plunger 44 and the support member 34. It will be recognized that an alternative embodiment wherein the springs are of the tension type, i.e. the convolutions are in contact when the spring is at its free length can be made. The spring ends must be attached at their respective ends to the plunger 44 and the support member 34.

Further, in the embodiment the valve has been described with respect to a single cavity or port type valve. It will be recognized by those familiar with the state of the art that the embodiment can be constructed in a valve of the double port type. Two cavities utilizing two sets of trim, each of which may employ the series of springs as described above. In such a double port valve body, the spring series in each cavity could be the same or differ in number so as to provide differing stages of pressure drop utilizing two actuators and split range valve positioners. Each spring series could also be pressure balanced and interconnected for synchronous action which would permit the use of relatively small actuator sizes to handle extremely high pressure drop applications.

The foregoing disclosure and description of the invention is illustrative and explanatory thereof, and various changes in its operation as well as in the details of the illustrated apparatus may be made within the scope of the appended claims without departing from the spirit of the invention.

What is claimed is:

1. A control valve comprising:
   a valve body, said valve body including an internal cavity, a fluid inlet and at least one fluid outlet, said outlet being in open communication with said cavity;
   a plurality of helical springs arranged one within the other and disposed in said cavity, the convolutions of the innermost of said spring defining a fluid media pathway in open communication with said inlet, said springs being disposed such that fluid flowing through said valve from said inlet to said outlet must flow through at least some of the convolutions of each of said springs in series; and means operable externally of said body for selectively effecting axial movement of the convolutions of at least one of said springs to thereby vary the axial spacing between the convolutions of said springs and thereby control the fluid flow from said pathway through the spaces between said convolutions into said cavity.

2. The apparatus of claim 1 including a spring support means disposed within said body, said springs being carried by said support means, said support means having a bore in open communication with said inlet, and said pathway.

3. The valve of claim 2 wherein said springs are concentrically disposed with the axis of the pathway of said innermost spring being coaxial with the axis of said bore of said support means.

4. The valve of claim 2 wherein said means operable from without said body includes a plunger means disposed in said body, said springs being disposed between said plunger and said support means and thus are means connected to said plunger for effecting reciprocal motion of said plunger means.

5. The valve of claim 1 wherein each adjacent pair of said springs comprise an inner spring and an outer spring, said inner and outer springs being spaced to form an axially extending annulus between the outer circumference of the convolutions of an inner spring and the inner circumference of the convolutions of an outer spring.

6. The valve of claim 5 further including means for maintaining said annulus between said springs.

7. The valve of claim 6 wherein said means for maintaining said annulus between said springs comprises spacing rods circumferentially staggered in said annulus.

8. The valve of claim 7 wherein opposed ends of said rods are received in opposed bores in said support means and said plunger means, respectively, said bores in said plunger means permitting reciprocal motion of said plunger means relative to said rods.

* * * * *